United States Patent [19]

Purguette

[11] Patent Number: 4,987,962
[45] Date of Patent: Jan. 29, 1991

[54] MOTION OR FORCE TAKE-OFF DEVICE FOR MOTOR VEHICLES

[76] Inventor: Edmond J. P. Purguette, Lycée Paul Cézanne - Avenue Fontenaille, 13100 Aix-en-Provence, France

[21] Appl. No.: 202,888

[22] Filed: Jun. 3, 1988

[30] Foreign Application Priority Data

Jun. 18, 1987 [FR] France .................. 87 08685

[51] Int. Cl.$^5$ .................. B60K 17/20; G01M 17/00
[52] U.S. Cl. .................. 180/53.6; 73/117; 74/14; 180/53.8; 180/198
[58] Field of Search .............. 180/53.6, 53.8, 53.2, 180/198, 53.61; 74/14; 73/117, 123, 126; 414/537

[56] References Cited

U.S. PATENT DOCUMENTS

| | | | |
|---|---|---|---|
| 1,850,019 | 3/1932 | Lobo, Sr. et al. | 74/14 |
| 2,696,104 | 12/1954 | Markey et al. | 73/117 X |
| 2,702,432 | 2/1955 | Martin | 73/117 X |
| 3,277,703 | 10/1966 | Cline | 73/117 X |
| 3,286,517 | 11/1966 | Ostrander | 73/117 |
| 3,411,346 | 11/1968 | Gagliardi | 73/117 |
| 3,418,849 | 12/1968 | Beer et al. | 73/117 |
| 3,520,180 | 7/1970 | Polhemus et al. | 73/117 X |
| 3,651,690 | 3/1972 | Pagdin et al. | 73/117 |
| 3,861,204 | 1/1975 | Fillingim | 73/117 |
| 4,158,961 | 6/1979 | Ben-David | 73/117 |
| 4,441,359 | 4/1984 | Ezoe | 73/117 |
| 4,455,866 | 6/1984 | Barrigar | 73/117 |

FOREIGN PATENT DOCUMENTS

| | | | |
|---|---|---|---|
| 932494 | 11/1947 | France . | |
| 210490 | 6/1984 | German Democratic Rep. | 73/117 |
| 99382 | 6/1923 | Switzerland . | |
| 352954 | 7/1931 | United Kingdom . | |
| 611756 | 11/1948 | United Kingdom | 74/14 |

Primary Examiner—Mitchell J. Hill
Attorney, Agent, or Firm—Dvorak and Traub

[57] ABSTRACT

The field of the invention relates to installations for transmitting motion or power to any measuring apparatus or to apparatus requiring a rotary drive. The device of the invention comprises a box frame, and an endless belt rotating over two parallel pulley shafts driving an external transmission system. Said belt and the pulley shafts are of the poly-V type in order to prevent the belt from slipping sideways off of the pulleys, and to prevent the vehicle escaping the frame. The box frame is pivotally mounted on a swivel frame which is free to swivel relative to a fixed frame in order to keep the belt in alignment with the vehicle wheel, either by direct adjustment or by automatic adjustment. The assembly is mounted on shock absorbers, and its height may be adjusted by standing it on an elevator platform. The speed of rotation of the vehicle engine is regulated by a tachometer and a regulator assembly.

11 Claims, 3 Drawing Sheets

MOTION OR FORCE TAKE-OFF DEVICE FOR MOTOR VEHICLES

DESCRIPTION

The present invention relates to motion or force take-off devices which make use of the rotation of at least one motor vehicle driving wheel.

The technical field of the invention concerns installations for transmitting motion or power to a measuring machine or to a machine requiring rotary drive.

One of the applications of the invention is to calibrate motor vehicle mileage counters without moving the vehicle. Another application is to drive machines which do not include an incorporated engine, for example electricity generator sets, pumps, compressors, etc. . . .

BACKGROUND OF THE INVENTION

Equipments for providing such power transmission have been known for a long time and a certain number of patents have been filed in this field. Mention may be made, for example, of Swiss pat. No. 99,382 in the name Mr. Schoedelin, filed Sept. 31, 1921 and relating to "a trailer suitable for hitching to a motor vehicle, and when stationary for receiving and making use of the driving force of the vehicle engine". This patent describes a device including a running path constituted by a belt carried by two pulleys and driven by the rotary motion of the driving wheels of the vehicle which is capable of mounting thereon once the trailer carrying said device has been unhitched and the device placed on the ground. The power taken off by driving the belt is then transmitted to a building site type of machine mounted on said trailer.

French Pat. No. 932 494 in the name of Mr. Lafay, filed Aug. 21, 1946 also describes a "mechanical control device actuated by the wheels of a motor vehicle". This device comprises a stand resting on the ground and carrying two shafts mounted on bearings and each receiving two waisted cylinders or else two cylinders which are then connected in pairs by endless belts. By placing the wheels of a vehicle on this device, the wheels will cause the waisted cylinders or the belts to rotate and further belts are then used to transmit the motion to any type of machine.

British Pat. No. 352 954 in the name of Mr. James, filed Apr. 14, 1930 describes "improved means for the transmission of power from the driving or traction wheels of motor vehicles". This patent describes a device for raising the axle carrying the driving wheels of the vehicle and, once the wheels have been lifted off the ground, for pressing a take-off wheel against each drive wheel with the take-off wheels then being driven by friction and transmitting motion to a transmission assembly.

However, it may be observed that the above-mentioned equipments have been known for more than 40 to 60 years without giving rise, at any rate in France and at present, to any significant or major development of machinery using this principle of taking off force from the wheel of a motor vehicle.

The above devices and others which have been tested since suffer from numerous drawbacks, some of which even make them dangerous to use:

Firstly, mention may be made of the very poor stability of a vehicle when using a belt mounted on pulleys (as in the first two above-mentioned patents): in order to achieve drive without slipping, it is necessary for the wheels to bear heavily against a taut belt or for the contact area to be large if the belt is relatively slack. In the absence of the special means of the present invention, both of these conditions give rise to forces perpendicular to the direction of belt rotation and as a result the belts are very quickly dislodged from the pulleys, and even when the pulleys are fitted with side plates or catches, the belt is damaged or the support mechanism gives way or the vehicle skids which can be dangerous for personnel.

The above general problem is particularly acute on rear-wheel drive vehicles because it is impossible to align the devices and the vehicle wheels correctly. Lateral forces are then increased and nothing can stand up to them.

Another solution for avoiding the above drawback is to use friction wheels pressing directly against the driving wheels, as in the third above-mentioned patent. Although large lateral forces remain, the lateral forces are reduced because the friction wheels provide better tangential contact in the direction of rotation and mechanical take-off is more easily controlled than it can be using a belt which must be left free. However, in this case the contact surface is small and power is therefore lost by slipping, giving rise to heating and to tire wear.

Further, regardless of which of the above devices is used, it is necessary for the device to be chocked up when used on ground which is sloping, as is frequently the case out of doors. If the above-mentioned basic problem is not to be made worse, it is essential for the vehicle-and-device assembly to be exactly horizontal. This therefore requires long and tedious adjustment and chocking up.

Finally, it may also be underlined that most applications require rotation at a given and constant speed: this applies, for example, to producing electricity (generator set), to producing a flow of air (compressor), or to supplying water (pump), and it is necessary to ensure that drive occurs at constant speed regardless of the load applied by the driven machine. It is then difficult to adjust the engine of the motor vehicle accordingly.

The problem is to be able to recover the motion or power transmitted to the wheels of a vehicle by the engine, in perfect safety and with high efficiency, without danger for the user or for the equipment, while retaining the possibility of adjusting the speed of rotation to a constant number of revolutions per minute (rpm) regardless of the torque applied by the machine taking off the power.

SUMMARY OF THE INVENTION

The problem posed is solved by the present invention which provides a motion take-off device for a motor vehicle, the device being of the type comprising at least one box frame supporting two pulley shafts mounted in parallel on bearings, with at least one of them being connected to transmission means and with the pulley shafts being surrounded by an endless belt for transmitting rotary motion thereto as generated by a wheel of said vehicle when mounted on said device, which wheel bears against said belt and drives it by friction, the device including the improvement whereby both of said pulley shafts include Poly-V type triangular-shaped circular ribs on their cylindrical outside surfaces, said ribs being situated in planes perpendicular to the shaft axes, while the inside face of the belt includes compensating ribs interfitting with the ribs of the pulley shafts.

An improved solution to the problem posed is a device in which said box frame is fixed on a swivel stand comprising a top frame including a suspension and shock-absorbing system, and a bottom frame on which the top frame is pivotally mounted to swivel in a horizontal plane relative to the bottom frame, thereby ensuring that the points of contact between the vehicle wheel and said belt have a common direction of tangential motion.

An improved solution to the problem posed is a device including at least one height-compensating subassembly, said height-compensating subassembly comprising a top jack frame for supporting said box frame either directly or indirectly, and a jack bottom frame which stands on the ground, said jack frames being interconnected by articulated arms which are guided by any conventional means in order to enable the jack frames to be moved towards each other and away from each other in order to adjust the height of the top jack frame relative to the ground.

An improved solution to the problem posed is a device including a regulation subassembly which includes, inter alia, a comparator for comparing the value of the speed of rotation as measured by said tachometer with a reference value, a D.C. motor whose shaft acts on conventional means for controlling the speed of the vehicle engine, a transcriber indicating the position of the shaft of said D.C. motor, and a feed interface controlled by the comparator and driving the D.C. motor.

The result is a novel motion or force take-off device which uses the rotation of at least one motor vehicle driving wheel.

These devices provide numerous advantages, they are efficient, safe, adaptable to any type of vehicle or application, and they are reliable.

Devices made in accordance with the invention provide a large contact area between the belt and the vehicle wheel, thereby guaranteeing rotary drive without slipping, and thus without tire wear and without loss of energy.

Further, the contact surfaces of the belt and the pulleys include triangular-shaped Poly-V type interfitting ribs which prevent lateral slipping relative to each other and avoid the dangers of the belt being damaged or being dislodged from the pulleys. This has been verified during numerous tests and results from work and testing on other systems.

Safety is also increased by the box frame being free to swivel relative to the ground, thereby enabling optimum alignment between the wheel and the belt to be obtained and thus reducing lateral forces and the risks of the vehicle escaping. Additional safety systems such as those described below may also and advantageously guarantee user safety against such risks.

The device as a whole can be used with any type of vehicle, regardless of whether it has front-wheel drive or rear-wheel drive, and on any terrain, even sloping ground or stepped ground such as a roadside curb, and it may be used to drive any type of machine, including a machine constituting a varying load.

One application of the device, other than taking off force for the purpose of driving a machine, is to calibrate the instruments of a motor vehicle, e.g. to verify taxi-meters, or else to tune the engine itself in a garage where it can be tuned at various speeds under given torque brake loading.

BRIEF DESCRIPTION OF THE DRAWINGS

The following description refers to the accompanying drawings which show an embodiment of a device in accordance with the invention by way of non-limiting example. This example is not exhaustive and other devices may be designed, and in particular two box frames have been shown beneath two drive wheels, but it is possible to make use of one only. Further, the driven machine is shown as being carried by the vehicle, whereas it could be permanently fixed to the ground, or else merely placed thereon in use. In the drawings.

MORE DETAILED DESCRIPTION

Figure 1:
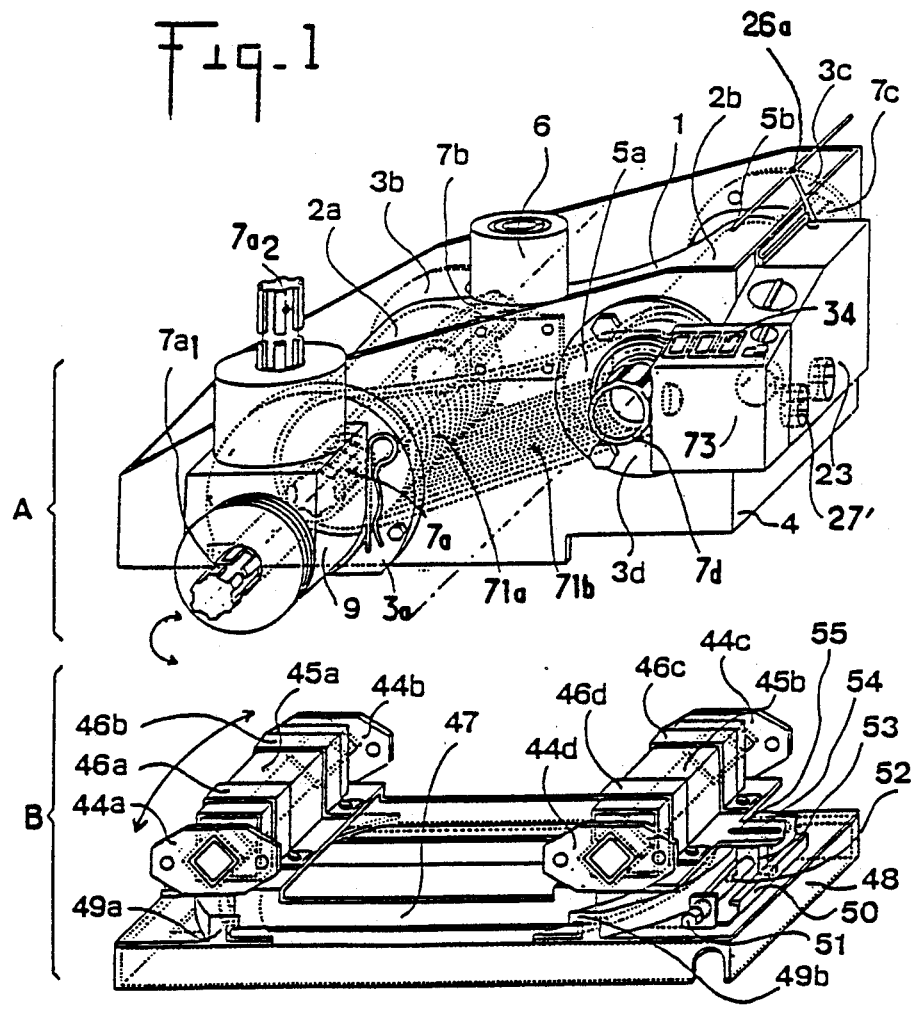
FIG. 1 is a perspective view of the two main subassemblies constituting a device, one serving to take-off motion and the other providing swivelling.

FIG. 1 shows two subassemblies A and B which, after assembly, constitute a module C for taking-off motion and for swivelling.

The first subassembly A for taking-off motion comprises a box frame 4 supporting two shafts which are formed to constitute Poly-V type pulleys 2a and 2b, i.e. pulleys whose outer surfaces include circular ribs 71a which are triangular in section and which occupy planes perpendicular to the axes of the shafts. The shafts are mounted parallel, and the axis of one of them may be higher than the axis of the other depending on whether the device is intended for use with a rear-wheel drive vehicle or with a front-wheel drive vehicle. However, in a versatile device, both shafts may be in the same horizontal plane. The device shown here is more particularly for a front-wheel drive vehicle or for a rear-wheel drive vehicle used in reverse gear.

A Poly-V type endless belt 1 runs over the two pulley shafts 2a and 2b and has ribs 71b on its inside face which are profiled to interfit with the ribs on the pulley shafts, thereby preventing any relative lateral displacement between said pulleys and the belt 1.

Figure 4:
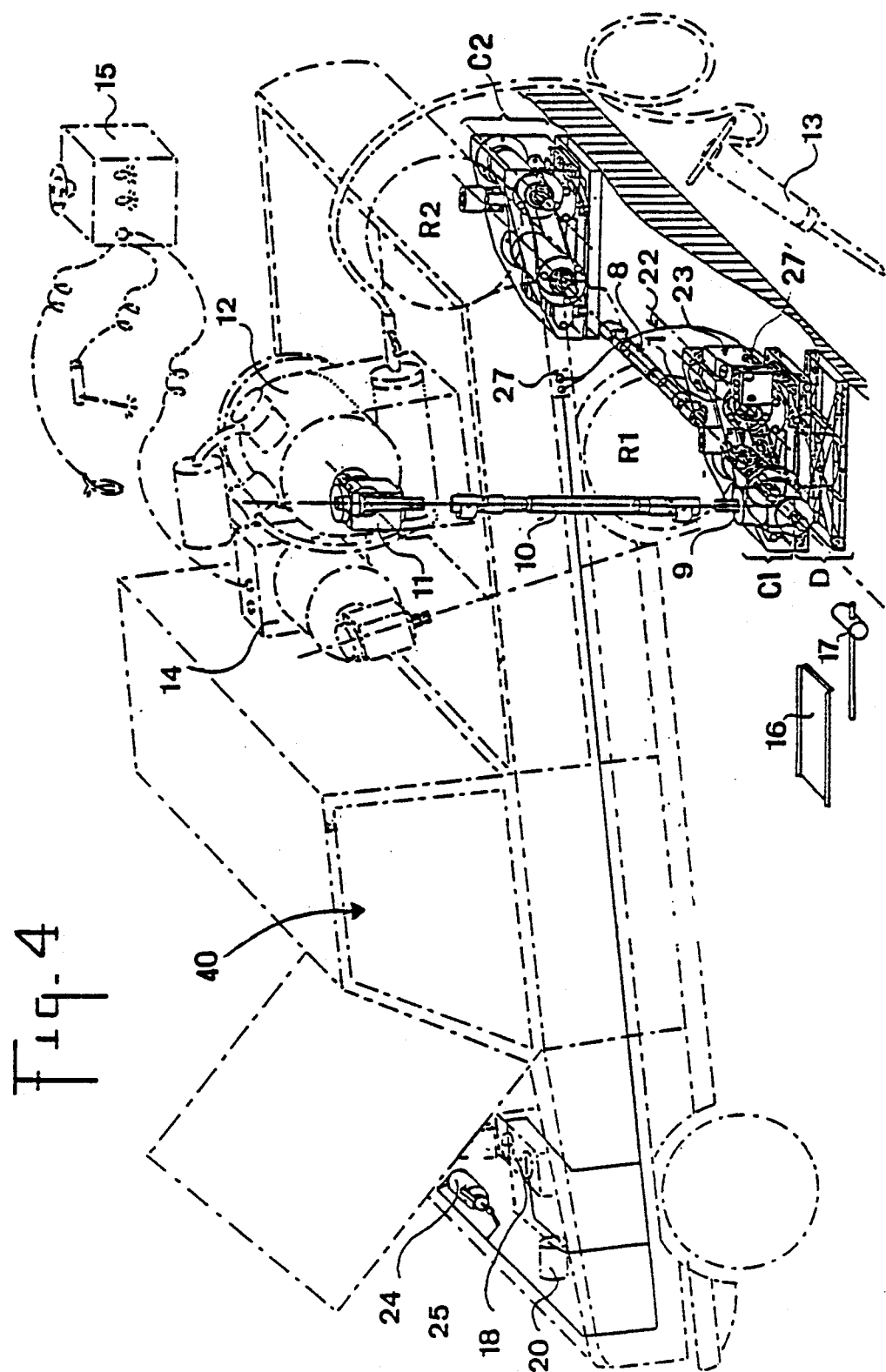
FIG. 4 is a perspective view of a complete device placed beneath a small truck-type vehicle and serving to drive various types of equipment carried by the vehicle.

The pulley receives a driving wheel R1 of a vehicle, as shown in FIG. 4. In order to make this possible, and also to obtain optimum safety and efficiency, the pulley 1 is preferably two to three times as wide as the wheel, and thus includes about fifty ribs 71b for use with a private vehicle, or the like. The length of the belt is a function of the gap between the two shafts 2a and 2b and it is put under tension by displacing and locking the shaft 2b along elongate slots 5a and 5b extending in a direction close to that defined by the plane containing the two axes of said shafts.

The pulley shafts 2 may be much smaller in diameter than the drive wheels R1 since it is the belt 1 which fits around the drive wheels and which provides the curvature required for obtaining a large contact area, thereby avoiding slipping and heating.

The outside surface of the belt which comes into contact with the wheel may be covered with an anti-skid and an anti-abrasive coating.

The pulley shafts 2a and 2b are mounted on flanged ball bearings 3a and 3b for shaft 2a, and 3c and 3d for shaft 2b, which bearings are fixed to the box frame 4.

The ends of the shafts 2 projecting outside the box frame are fitted with end fittings, e.g. fluted end fittings 7a, 7b, 7c, and 7d, enabling them to be coupled to any system or means for transmitting rotary motion. For example, a gear box 9 with an adjustable angle outlet may be fitted on the end fitting 7a, thus providing two fluted shaft outlets 7a1 and 7a2 having perpendicular axes.

By way of example, and optionally, a housing 23 may be mounted on the box frame 4 for the purpose of performing three functions, which may be mounted independently or together. The first function is measurement of the speed of rotation of the shaft 2b or, after conversion, the speed of rotation of the wheel R1 or the equivalent speed of the vehicle by means of tachometer equipment 73 including a display 34 and using any suitable conventional opto-electronic type of sensor. The second function is to regulate the vehicle engine via a connector 27' in order to retain a constant speed of rotation, and the third function is an escape safety function which switches off the vehicle engine if there is any risk of the wheel R1 escaping, as detected by the wheel pressing against a lever 26a or engaging any other position sensor, with the position sensor being associated with a switch for switching off the engine.

Figure 3:
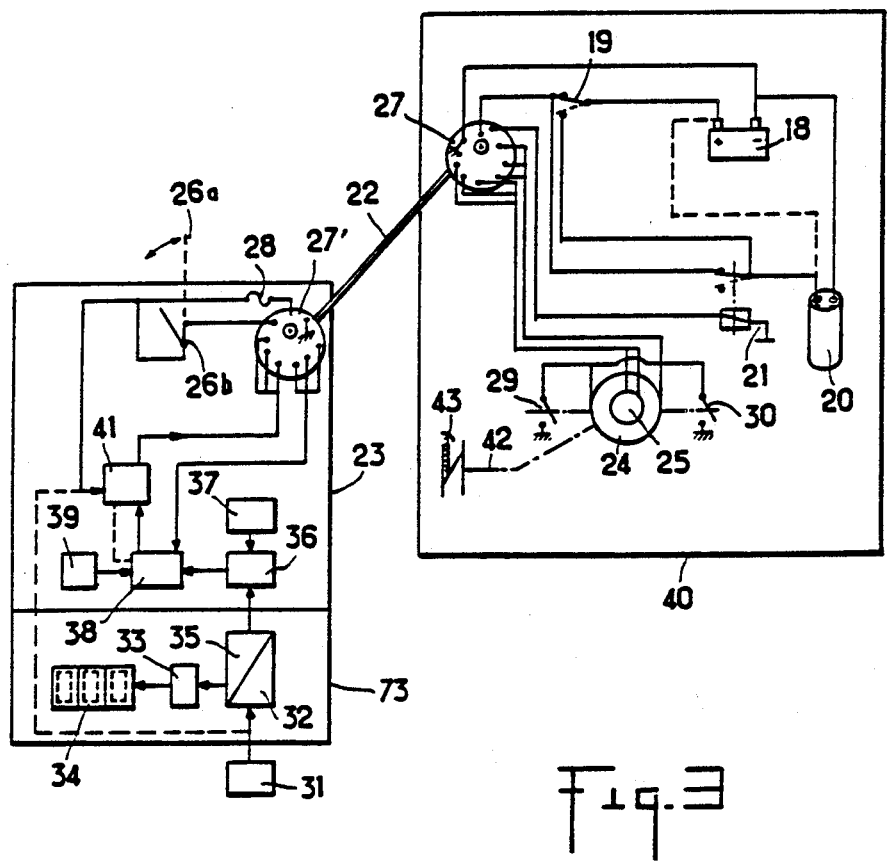
FIG. 3 is a block diagram of the wiring system in the subassembly for monitoring and regulating speed.

An example of the electrical circuit in the housing 23 is shown in FIG. 3.

The second, regulation function may be mounted in a housing which is independent from the box frame 4 and which is connected to the box frame via a cable.

The box frame 4 may also include at least one lateral safety roller 6 mounted to rotate about a vertical axis and placed on at least one of the sides of said frame. The roller constitutes an abutment which prevents the vehicle wheel R1 from escaping sideways if it bears thereagainst, and since it can rotate, it is rotated by the wheel without wearing the side of its tire.

The first subassembly A is mounted on a second or swivel stand subassembly B by fastening support plates 44a, 44b, 44c, and 44d of the subassembly B on the frame 4 by any suitable assembly means, e.g. bolts. The support plates are themselves fixed to shock absorbing systems 45a and 45b which reduce shock and vibration, and which are connected to a swivelling frame 47 via fixings 46a, 46b, 46c, and 46d. This system or any equivalent system serves to reduce noise pollution and to increase the lifetime of the components.

Said swivelling frame 47 is pivotally mounted to swivel in a horizontal plane relative to a stationary frame 48 on which it stands. By way of example, and as shown in FIG. 1, rotation is made possible by guides 49a and 49b which are in the form of circular sectors and which are fixed to the stationary frame 48. The swivelling frame 47 includes sectors of circular rails which are free to slide and rotate in the guides, either by means of a self-lubricating material, or else by means of a ball bearing system.

The relative positions of the two subassemblies A and B thus makes two types of utilization possible, with only a first type being shown in FIG. 1:

(1) If the two subassemblies are assembled in such a manner as to cause the axis of rotation of the swivelling frame 47 to intersect the axis of the wheel R1 perpendicularly, with said axis being situated in the mid plane between the two pulley shafts 2a and 2b, then the alignment of the box frame 4 and thus of the belt 1 is adjusted to said wheel so that their points of contact move in a common direction. This considerably reduces lateral forces and limits the risks of the vehicle escaping sideways or of the belt being dislodged from its pulleys. For this purpose, an adjustment system 50 is disposed on the stationary frame 48, whereby rotating a screw head 51 causes a cursor 53 to move along a threaded rod 52, thereby causing a lug 54 on the cursor to rotate the swivelling frame 47 by engaging in a slot 55.

(2) If the two subassemblies are assembled in such a manner that the axis of rotation of the swivelling frame 47 is offset forwardly relative to the axis of the wheel or to the mid plane between the two pulley shafts 2a and 2b, then the above-described alignment will happen automatically since any lateral force will always tend to swivel the swivelling frame until it reaches a point of equilibrium. This solution does not require an adjustment system 50.

Figure 2:
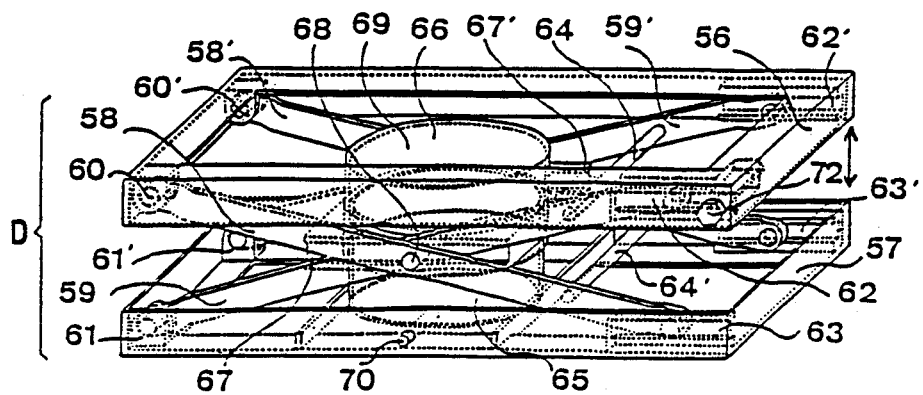
FIG. 2 is a perspective view of a subassembly for compensating a difference in height.

FIG. 2 is a perspective view of a jack subassembly D for compensating differences in height, in order to ensure that a vehicle is horizontal even on sloping ground, thereby ensuring that the force take-off device described with reference to FIG. 1 operates under optimum conditions.

The subassembly D comprises two jack frames 56 and 57, with the top jack frame 56 being suitable for receiving the stationary bottom frame 48 of the take-off and swivel stand module C as described with reference to FIG. 1, and with the bottom jack frame 57 resting on the ground.

The two jack frames 56 and 57 are interconnected by pairs of arms 58 & 59 and 58' & 59'. Each of these arms is pivotally mounted at one end in a fixed cradle 60, 61, 60', or 61' fixed to one side of one or other of the jack frames and constituting a pivot. The opposite ends of the arms slide in respective guides 62, 63, 62', and 63' which are fixed to the opposite sides of the opposite jack frames.

The arms are held together in pairs at a suitable spacing apart by spacers 64 and 64'.

The jack frames 56 and 57 can thus be moved apart from each other for the purpose of raising a load by any appropriate hydraulic, pneumatic, or mechanical jack system. For example, a fixed cylindrical housing 65 may be fixed to the bottom jack frame 57 and a moving portion 66 fitted with guides 67 and 67' receiving the pivot axes 68 and 68' of the arms 58 & 59 and 58' & 59' may be slidably mounted thereon. The assembly comprising the fixed housing 65 and the moving housing 66 may contain a vehicle inner tube 69.

This inner tube may be inflated via a valve connection 70, thereby thrusting the moving portion 66 of the housing upwards and thus raising the pairs of arms 58 & 59 and 58' & 59' via their axes 68 and 68', and thus raising the top jack frame 56 and any load which may be standing thereon, in particular the take-off and swivel stand module C and thus the wheel of a vehicle standing thereon.

Once the appropriate height is achieved, a safety chock is put into place to prevent the top jack frame 56 from coming down again, or else at least two of the four ends of the arms in the guides 62, 63, 62', and 63' are locked by abutments 72.

FIG. 3 is a diagram of the wiring in the subassembly for measuring, monitoring, and regulating speed, as included in the housing 23 mentioned with reference to FIG. 1.

This system includes a tachometer equipment 73 which receives a signal from a sensor 31, e.g. of the opto-electronic type, which may be mounted, for example, on or in the vicinity of the shaft 2b (see FIG. 1). Said signal is shaped by a converter 35 which is connected to a clock 32 and which delivers a signal in the form of rectangular pulses at a frequency which is proportional to the detected speed of rotation. The signal from the converter 35 is directed at 33 for the purpose of being calibrated, measured, and decoded for the purpose of providing a quickly readable optical display which is both direct and accurate, and which indicates either the speed of rotation of the rotating shaft, or the speed of the vehicle wheel (as a number of rpm), or else, by integration, the equivalent distance travelled by the vehicle.

The tachometer equipment 73 may operate independently from the remainder of the regulation subassembly 23, in particular for applications relating to verifying distance-travelled instrument (mileage counters).

The signal coming from the converter element 35 may also be delivered in the form of an analog D.C. voltage whose value is proportional to the rpm detected by the sensor 31.

A reference value generator 37 (for preselecting the desired speed of the rotary shaft and thus the speed of the engine) provides an output voltage which is compared by a differential amplifier 36 with the voltage coming from the converter 35.

A result signal from the differential amplifier 36 is compared by a comparator 38 (using a preadjusted window 39 defining the hysteresis of the comparator 38) with a signal from a transcriber 25 whose output signal varies as a function of the mechanical position of a D.C. motor 24 defined below.

The comparator 38 may be inhibited at any moment, in which case the final power interface 41 is no longer powered and the D.C. motor 24 stops immediately.

The D.C. motor 24 is allowed to rotate in either direction by the type of signal coming from the comparator 38, depending on whether the rotary shaft is rotating too slowly or too fast. Such rotation in one direction or the other of the D.C. motor 24 gives rise to a variation in the transcriber 25 connected to the shaft of the motor 24. Said transcriber 25 applies a signal to the comparator 38 which thus continuously compares the outputs from the differential amplifier 36 and from the transcriber 25, thereby giving rise to rotation in one direction or the other, or to no rotation, of the D.C. motor 24. The motor 24 is mounted on a gasoline vehicle 40 so as to operate its throttle valve 43 via a drive 42, thereby regulating the speed of the motor and thus the speed of rotation of the pulley shaft in the motion force take-off device, even if the device is subjected to a varying load.

In a diesel-engined vehicle, the motor 24 acts on the diesel pump, and in any vehicle, it may be disposed to act directly on the accelerator pedal by means of a linear motion, instead of using a rotary motion.

The housing 23 also carries a front safety switch 26 as described with reference to FIG. 1, a protective fuse 28, and a connector 27' for providing a connection to a ten-conductor cable 22 which provides the various connections between said housing and the vehicle 40 on which another connector 27 may be permanently mounted if use is frequent, for the purpose of connecting the members located in the vehicle and required for regulating its engine speed, e.g. the D.C. motor 24 and the transcriber 25.

The wiring inside the vehicle 40 also includes a connection to a D.C. supply 18, which may be constituted by the vehicle battery.

A manual switch member 19 serves to switch on and off the electronic speed regulating system by switching on or off the positive feed to the coil 20 (for a gasoline vehicle) or the solenoid controlling the fuel inlet (for a diesel vehicle) via a relay 21.

Further, if the safety switch 26b mounted on the housing 23 is operated, the state of the relay 21 is changed, thereby switching off the coil or the solenoid 20 and zeroing the reference value by virtue of the front safety switch 26 being operated. The D.C. motor 24 is thus set to its initial position. Further, two switches 29 and 30 which are mechanically fixed to the D.C. motor 24 serve to limit the stroke thereof by acting on the comparator 38, thereby preventing any possibility of misfunction due to it exceeding its maximum rotation.

FIG. 4 is a perspective view of a device in accordance with the invention in use, said figure showing various subassemblies which have already been described with reference to the preceding figures, together with a vehicle 40 of the pick-up truck type having a rear portion suitable for transporting a load. This vehicle is a rear-wheel drive vehicle and its two drive wheels R1 and R2 are standing on respective modules C1 and C2, each being constituted by subassemblies as described with reference to FIG. 1.

The vehicle is shown as being on sloping ground, and module C1 is standing on a jack subassembly D for compensating a difference in height as described with reference to FIG. 2, thereby enabling the wheel R1 to be raised to the same horizontal plane as the wheel R2.

In order to avoid any differential effect between the two wheels and to pick up the drive power which is shared over both of them, a shaft 8 is coupled via two quick fastening universal joints to the fluted end fittings 7 of corresponding shafts in the two modules C1 and C2, which end fittings are described above with reference to FIG. 1.

Two removable access ramps 16 serve to allow the vehicle 40 to be driven on and off the device under its own power. When driving on or off, it is essential to lock one of the pulley shafts of each module by means of a removable key 17 so that the pulleys do not rotate, said keys being fitted over the fluted end fittings 7a and coming into abutment against the ground.

Once in position on the two modules C1 and C2, the wheels R1 and R2 operating in reverse drive the belts 1 of the device by friction such that the belts rotate together with their pulley shafts and transmit power and motion by rotation to the pointable shaft of the angle gear box 9, which shaft may be connected, for example, to a shaft 10 having quick-fastening universal joints and serving to drive another angle gear box 11.

The angle gear box 11 may be used, at will, to drive any of the machines carried by the vehicle 40, which machines do not include their own engines. For example it may drive a building site compressor 12 which feeds one or more road drills 13, or an alternator 14 for powering welding equipment 15, or any other machine having an electric motor, e.g. for the purpose of sawing, cutting, drilling, grinding, etc. at locations not connected to the electricity grid, or to drive agricultural machinery or building machinery without an integral engine, and the range of powers available may be quite considerable, for example 10 HP to 30 HP.

In this type of application, it is advantageous, and even necessary, to be able to regulate the speed at which the drive shaft 10 is rotated. To make this possible, the module C1 is fitted with a regulation housing 23 as described with reference to FIGS. 1 and 3, and a cable 22 provides a connection between a connector 27' on said housing and a connector 27 on the vehicle. As described with reference to FIG. 3, the vehicle connector is connected to the various members required for regulating its engine speed, including the battery 18, the coil or the fuel inlet solenoid 20, the D.C. motor 24, and the transcriber 25. If the vehicle 40 is commonly used with the invention, it may be permanently equipped with the means for regulating its engine.

Another implementation consists in coupling one of the drive axes to a driving machine which imparts its own motion to the device, while the engine of the vehicle being stopped or operating, for the purpose of testing braking capacity or for balancing its transmission, for example.

The present invention is not limited to the embodiments described above, which constitute examples only to which numerous variations and modifications may be applied.

I claim:

1. A power transmission device for transmitting power from a motor vehicle wheel to a driven machine, or from a driving machine to said motor vehicle wheel, comprising: a box frame, two parallel pulley shafts mounted for rotation in said box frame, each of said pulley shafts having a cylindrical outside surface extending along an axis, circular shaft ribs disposed on said outside surface which extend in juxtaposed planes perpendicular to said axes, an endless belt extending between and surrounding said pulley shafts, said belt having an inner surface provided with longitudinal juxtaposed belt ribs interfitting with said shaft ribs, said belt having a width at least as great as the width of the motor vehicle wheel and having an outside surface frictionally engaging said wheel, a distance between said pulley shafts causing said wheel to bear on said pulley shafts and on a portion of said belt facing said wheel and extending between said pulley shafts, at least one of said pulley shafts being connected to said driven or driving machine, a bottom frame lying under said box frame, said box frame being pivotally mounted on said bottom frame about a swivel axis, said swivel axis being substantially perpendicular to said belt and extending in a plane transverse to said pulley shafts, situated in an axially median region thereof.

2. A device according to claim 1, wherein said swivel axis is in a mid-plane between said pulley shafts.

3. A device according to claim 1, wherein said swivel axis is offset with respect to a mid-plane between said pulley shafts.

4. A device according to claim 1, comprising a top frame, said box frame being connected to said top frame by shock-absorbing means, and said top frame being pivotally mounted on said bottom frame.

5. A device according to claim 1, comprising at least one abutment roller mounted for rotation about an axis parallel to said swivel axis and situated on one side of said belt.

6. A device according to claim 1, wherein said shaft ribs and said belt ribs have triangular-shaped cross-sections.

7. A device according to claim 1, further comprising height-compensating means having a top jackframe for supporting said box frame and a bottom frame, and a bottom jackframe for standing on the ground, said top and bottom jackframes being interconnected by two pairs of articulated arms, and means for moving said jackframes toward and away from each other.

8. A power transmission device comprising a first and a second power transmission device according to claim 1, said first and said second power transmission devices cooperating with two motor vehicle wheels respectively, a universal joint assembly connecting a pulley shaft of said first device to a pulley shaft of said second device, and a pulley shaft of one of said devices being connected to a driven or driving machine.

9. A device according to claim 1, wherein said box frame comprises a tachometer for monitoring rotation, and a sensor for counting the revolutions of one of said shafts, a clock, a converter, and at least one display for displaying either rotary speed, or a total number of revolutions, or a distance.

10. A device according to claim 9, comprising a regulation sub-assembly having a comparator for comparing the value of the speed of rotation of said pully shafts as measured by said tachometer with a reference value, a DC motor having a shaft for controlling the speed of a vehicle engine, a transcriber indicating the position of said DC motor shaft, and a power interface controlled by said comparator, whereby said power interface controls said DC motor.

11. A device according to claim 10, comprising a position sensor adapted to send a signal to a safety switch disposed at a leading end of said belt, whereby, upon engagement of a wheel with said sensor, said safety switch acts to cease operation of the motor vehicle.

* * * * *